(12) United States Patent
Hsiao et al.

(10) Patent No.: US 7,611,274 B2
(45) Date of Patent: Nov. 3, 2009

(54) LIGHT-SOURCE FIXING STRUCTURE FOR BACKLIGHT MODULE

(75) Inventors: Chih-Chun Hsiao, Padeh (TW); Cheng-Min Liao, Padeh (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 156 days.

(21) Appl. No.: 11/585,973

(22) Filed: Oct. 25, 2006

(65) Prior Publication Data
US 2008/0049444 A1 Feb. 28, 2008

(30) Foreign Application Priority Data
Aug. 22, 2006 (TW) .............................. 95130818 A

(51) Int. Cl.
*F21V 21/00* (2006.01)
(52) U.S. Cl. ...................... 362/634; 362/632; 362/633; 362/613
(58) Field of Classification Search .......... 362/600–634
See application file for complete search history.

(56) References Cited

U.S. PATENT DOCUMENTS

| 5,222,799 | A * | 6/1993 | Sears et al. ................. 362/146 |
| 6,502,968 | B1 * | 1/2003 | Simon ........................ 362/489 |
| 6,840,646 | B2 * | 1/2005 | Cornelissen et al. ........ 362/606 |

FOREIGN PATENT DOCUMENTS

| CN | 2634527 | 8/2004 |
| JP | 2003-279973 | 10/2003 |
| JP | 2006-185628 | 7/2006 |

* cited by examiner

*Primary Examiner*—Anabel M Ton
(74) *Attorney, Agent, or Firm*—Jianq Chyun IP Office

(57) ABSTRACT

A light-source fixing structure for the backlight module is disclosed. The light-source fixing structure includes: a light guide plate provided with a light-incident surface; a cover having a groove, wherein the groove has a surface facing toward to the light-incident surface of the light guide plate; a light bar arranged upon the surface of the groove. The light bar may be replaced easily by sliding out from the groove when the light bar is damaged. The cover not only may enhance the strength of the backlight module but also may prevent the backlight module over temperature.

9 Claims, 6 Drawing Sheets

LIGHT-SOURCE FIXING STRUCTURE FOR BACKLIGHT MODULE

BACKGROUND

1. Field of the Invention

The present invention generally relates to a backlight module, and more especially, to a light-source fixing structure for the backlight module.

2. Description of the Prior Art

The backlight module is one of the critical components of the liquid crystal display (LCD); it has been utilized on digital camera, personal digital assistant (PDA) and television. In general, the backlight module including a light source and a light guide plate (LGP) is arranged under the LCD panel in order to provide a uniform light to the LCD panel. According to position of the light source, there are two types of the backlight module: the side-light type, and the direct-light type.

Hence, the light source of the backlight module can be the cold cathode fluorescent lamp (CCFL) or the light emitting diode (LED), wherein the CCFL is the linear light-source; the LED is the point light-source. Then the light source can be irradiated to the LGP via the reflector. Referring to FIG. 1A, FIG. 1A is the cross-sectional view of the architecture of LED backlight module in accordance with the prior art. The backlight module 10 includes a light guide plate 20, a LED 30, and a printed circuit board 40. The light guide plate 20 is arranged on a frame 50, and the side edge of the frame 50 has a plurality of attaching grooves 51. The LED 30 is attached and composed by mounting the printed circuit board 40 having a plurality of projection part 41, wherein the projection part 41 of the printed circuit board 40 is fitted and held in the attaching grooves 51 of the frame 50, and then the printed circuit board 40 is arranged in the appropriate position so as to irradiate to the light guide plate 20. However, the printed circuit board 40 does not repair easily when the light emitting diode 30 on the printed circuit board 40 is damaged. In another conventional technology, such as shown in FIG. 1B, the backlight module 12 includes a light guide plate 22 and a plurality of light emitting diodes 32, wherein the light emitting diodes 32 are fixed on the flexible printed circuit board 42. Owing to the flexibility of the flexible printed circuit board 42, the light emitting diodes 32 can be arranged on the appropriate position of the mold frame 52, such as an indentation of the mold frame 52, so as to provide a side-light source to the light guide plate 22. Due to the bad heat-sinking capability of the flexible printed circuit board 42, the temperature around the light source will be over temperature when the operation is overtime. Besides, the structure strength of this kind of backlight module 12 may be another issue.

SUMMARY OF THE INVENTION

In order to solve the problems mentioned above, the present invention provides a fixing structure for the light source applied to the backlight module.

One object of the present invention is to provide a light-source fixing structure for the backlight module such that the light bar producing point light can be substituted for the lamp and can be arranged within the cover to provide the edge light to the light guide plate. Because of coating the reflection on the cover is unnecessary, the production cost will be lower down.

One object of the present invention is to provide a light-source fixing structure for the backlight module. The groove can be formed by ribbing the cover and the light bar can be slid in/out along the groove so that the groove and the light bar can cooperate to form a changeable mechanism. Hence, when the light bar was damaged, the light bar can be replaced easily by sliding out from the groove. Owing to these, the replace time will be reduced and the production cost will be lower down.

One object of the present invention is further to provide a light-source fixing structure for the backlight module such that the substrate made of metal having high conductivity can cooperate with the cover made of metal having good heat-sinking capability to lower the temperature around the backlight module. Furthermore, the cover can enhance the assembly structure, fix the light bar, and increase the reliability of the backlight module.

Accordingly, a light-source fixing structure for backlight module according to an embodiment of the present invention includes: a light guide plate provided with a light-incident surface; a cover having a groove, wherein the groove has a surface facing toward to the light-incident surface of the light guide plate; a light bar arranged on the surface of the groove.

Other advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
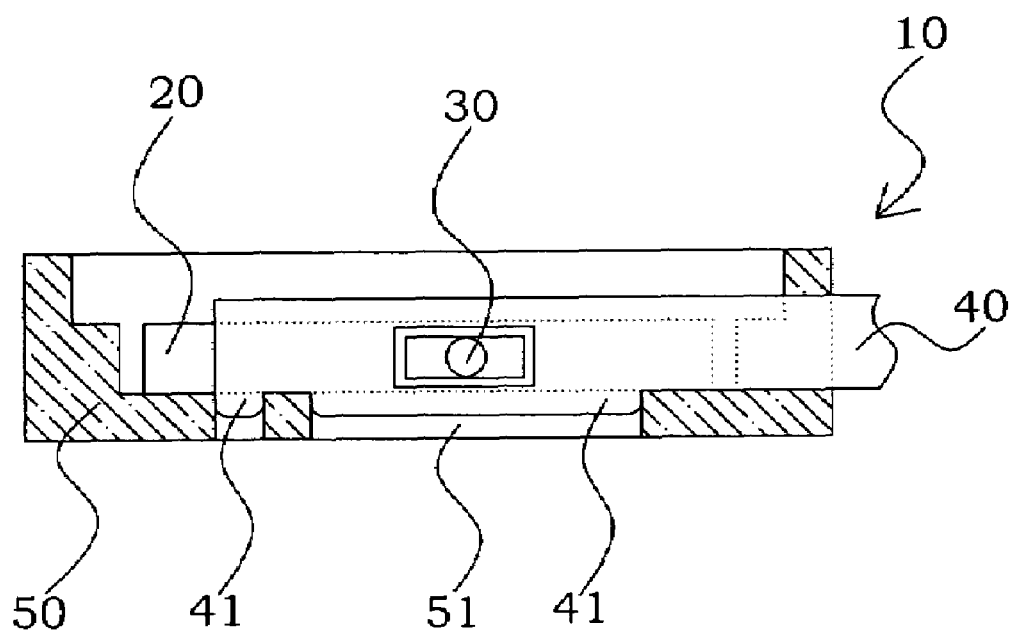
FIG. 1A is a schematic cross-sectional view of the architecture of the LED backlight module, in accordance with the prior art.
Figure 1B:
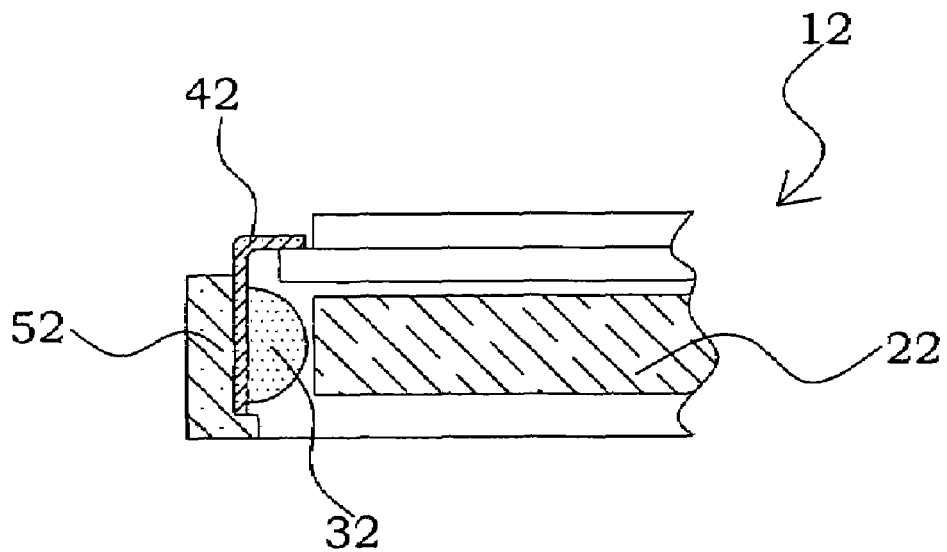
FIG. 1B is a schematic cross-sectional view of the architecture of the LED backlight module, in accordance with the prior art.
Figure 2A:
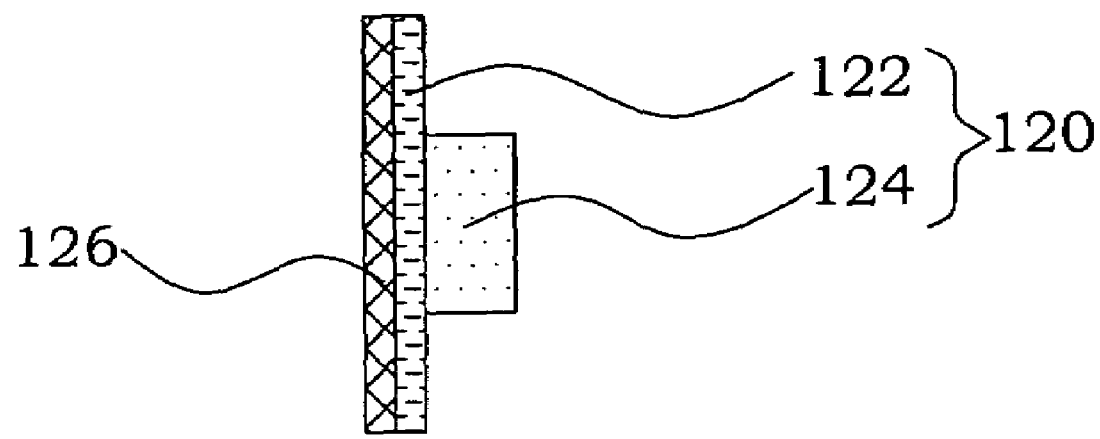
FIG. 2A is a cross-sectional view of the architecture of the light bar for the backlight module of the first embodiment, in accordance with the present invention.

Referring to FIG. 2A, FIG. 2A is a schematic cross-sectional view of the architecture of the light bar for the backlight module of the first embodiment in accordance with the present invention. Such as shown in FIG. 2A, the light bar 120 includes a substrate 122, for example a printed circuit board, and at least a light emitting diode 124 fixed on the substrate 122 by utilizing the conventional technology method. In one embodiment, the light bar 120 further includes a metal substrate 126 having good heat conductivity, such as aluminum (Al) or copper (Cu), adhered under the substrate 122 so as to increase the heat-sinking capability. Wherein the position of the light emitting diodes 124 attached on the substrate 122 is not limited. Besides, refer to FIG. 2B, the cover 130 includes the metal having good heat-sinking capability, such as Al, and the interior surface 131 thereof has a groove 132. Wherein the groove 132 has a surface 135 facing toward to the light-incident surface of the light guide plate (not shown in the figure) so as the light bar 120 shown in FIG. 2A can be inserted and fixed within the cover 130. In one embodiment, the method of forming the groove 132 includes punching the exterior surface 133 of the cover 130. Moreover, refer to FIG. 2C, FIG. 2C is a cross-sectional view of the architecture of the assembly structure of the light bar 120 shown in FIG. 2A and the cover 130 shown in FIG. 2B. The light bar 120 may be arranged and fitted within the groove 132 of the interior surface 131 of the cover 130 and may slide in/out from the groove 132 so as the light bar 120 may be replaced easily. In one embodiment, the fixing elements, such as the screws, may be utilized to screw the cover 130 and the light bar 120 together so as to enhance the module strength.

Figure 3A:
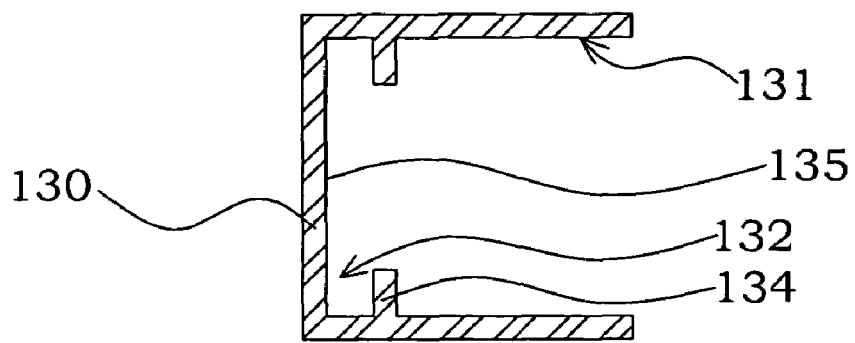
FIG. 3A is a cross-sectional view of the architecture of the light-source fixing structure for the backlight module of the second embodiment, in accordance with the present invention.
Figure 3B:
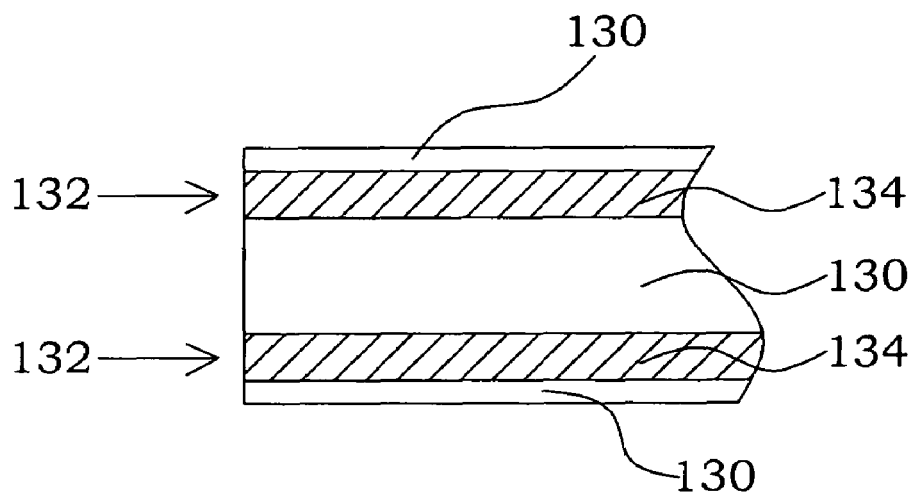
FIG. 3B is a front view of the architecture of the cover of the light-source fixing structure for the backlight module of another embodiment, in accordance with FIG. 3A of the present invention.
Figure 3C:
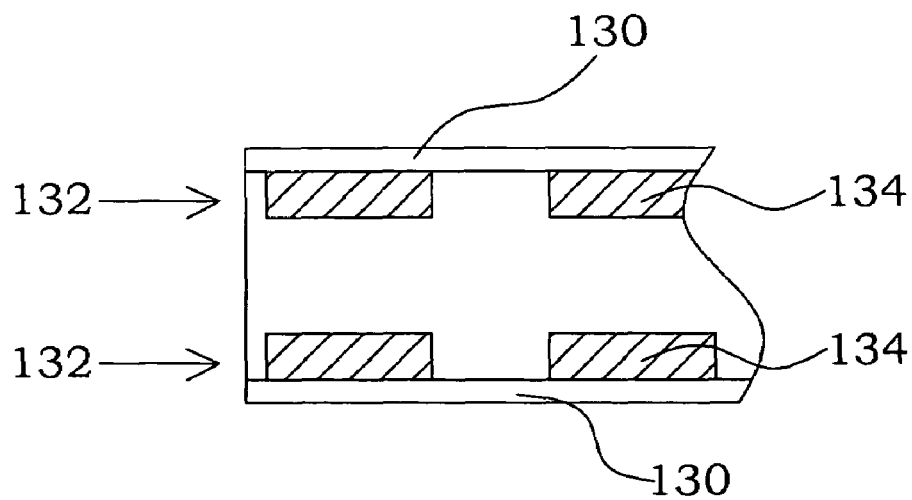
FIG. 3C is a front view of the architecture of the cover of the light-source fixing structure for the backlight module of another embodiment, in accordance with FIG. 3A of the present invention.
Figure 3D:
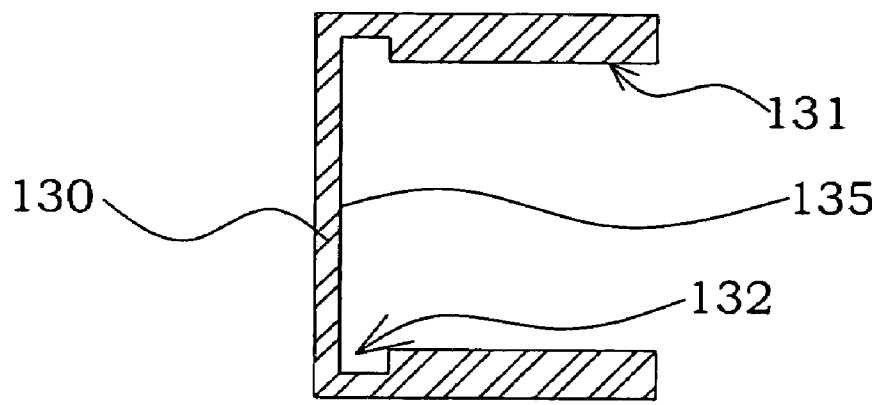
FIG. 3D is a cross-sectional view of the architecture of the cover of the light-source fixing structure for the backlight module of the third embodiment, in accordance with the present invention.

The architecture of the light-source fixing structure for the backlight module of the second and the third embodiments in accordance with the present invention are shown from FIG. 3A to FIG. 3D. Referring to FIG. 3A, the difference between this embodiment and last one is the groove 132 of the interior surface 131 of the cover 130 formed by utilizing at least a protruded rib 134 projecting from the interior surface 131 of the cover 130. Wherein the groove 132 has a surface 135 facing toward to the light-incident surface of the light guide plate (not shown in the figure) so as the light bar 120 (shown in FIG. 2A) can be inserted and fixed within the cover 130. FIG. 3B and FIG. 3C are the front views of the architecture of the cover 130 in different embodiment shown in FIG. 3A individually. The protruded rib 134 may be the bar-type structure, such as shown in FIG. 3B, or a plurality of isolated bump-type structure, as shown in FIG. 3C, and the shape of the protruded rib 134 is not limited in these figures. Besides, in another embodiment, as shown in FIG. 3D, the groove 132 of the interior surface 131 of the cover 130 may be formed by concaving the interior surface 131, the shape of the groove 132 is not restricted in these figures.

Figure 2B:
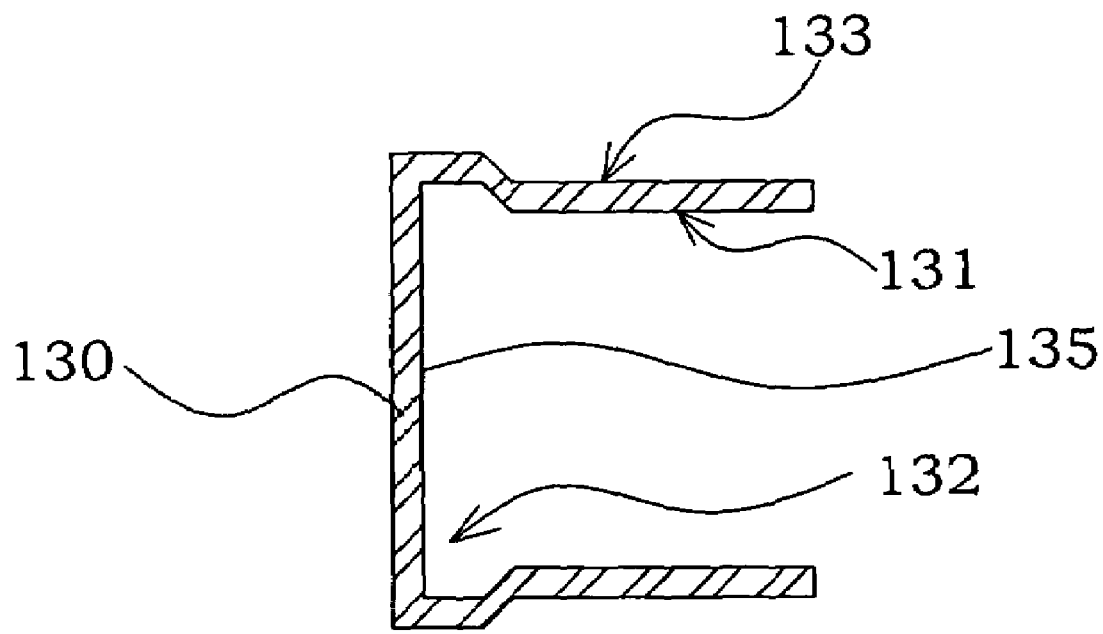
FIG. 2B is a cross-sectional view of the architecture of the cover for the backlight module of the first embodiment, in accordance with the present invention.
Figure 2C:
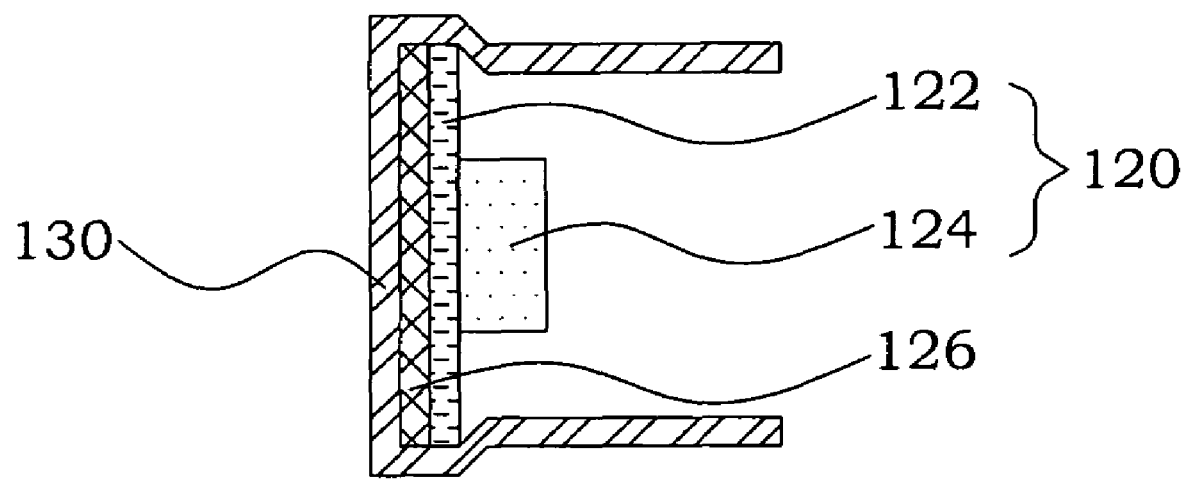
FIG. 2C is a cross-sectional view of the architecture of the light-source fixing structure for the backlight module of the first embodiment, in accordance with the present invention.
Figure 4:
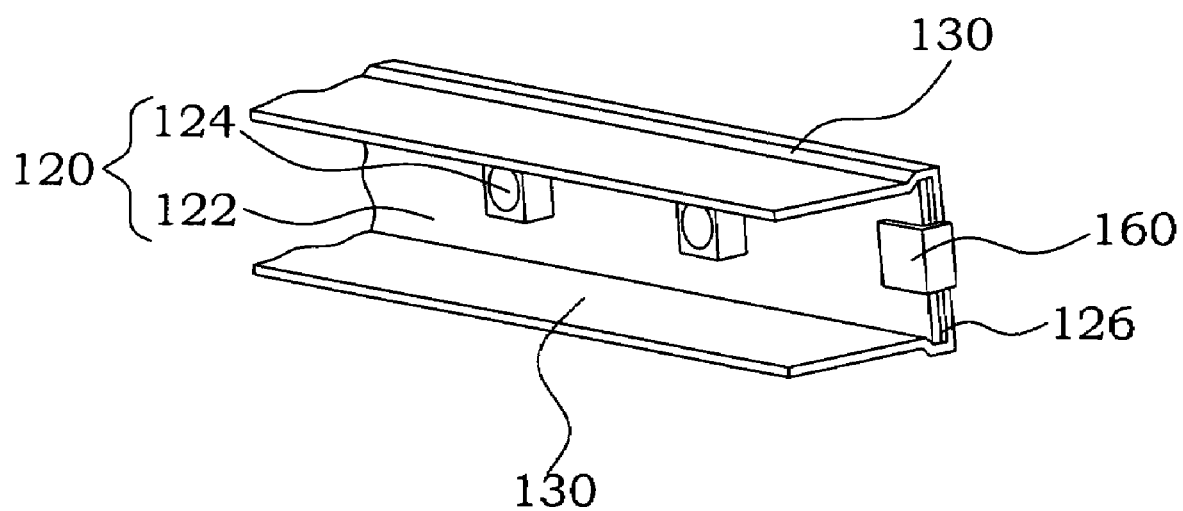
FIG. 4 is a 3-D view of the architecture of the light-source fixing structure for the backlight module of the forth embodiment, in accordance with the present invention.

In the forth embodiment, referring to FIG. 4, FIG. 4 is a 3-D view of the architecture of an example of the cover 130 shown in FIG. 2B. In order to arrange the light bar 120 in the cover 130 steady, the light-source fixing structure for the backlight module in present invention further includes at least a crook 160 arranged on two sides of the cover 130 so as to fix the light bar 120. Furthermore, the module may have a plurality of the fixing elements, such as the screws, arranged on two sides of the cover 130 or between two of the light emitting diodes 124 in order to join the light bar 120 and the cover 130.

Figure 5:
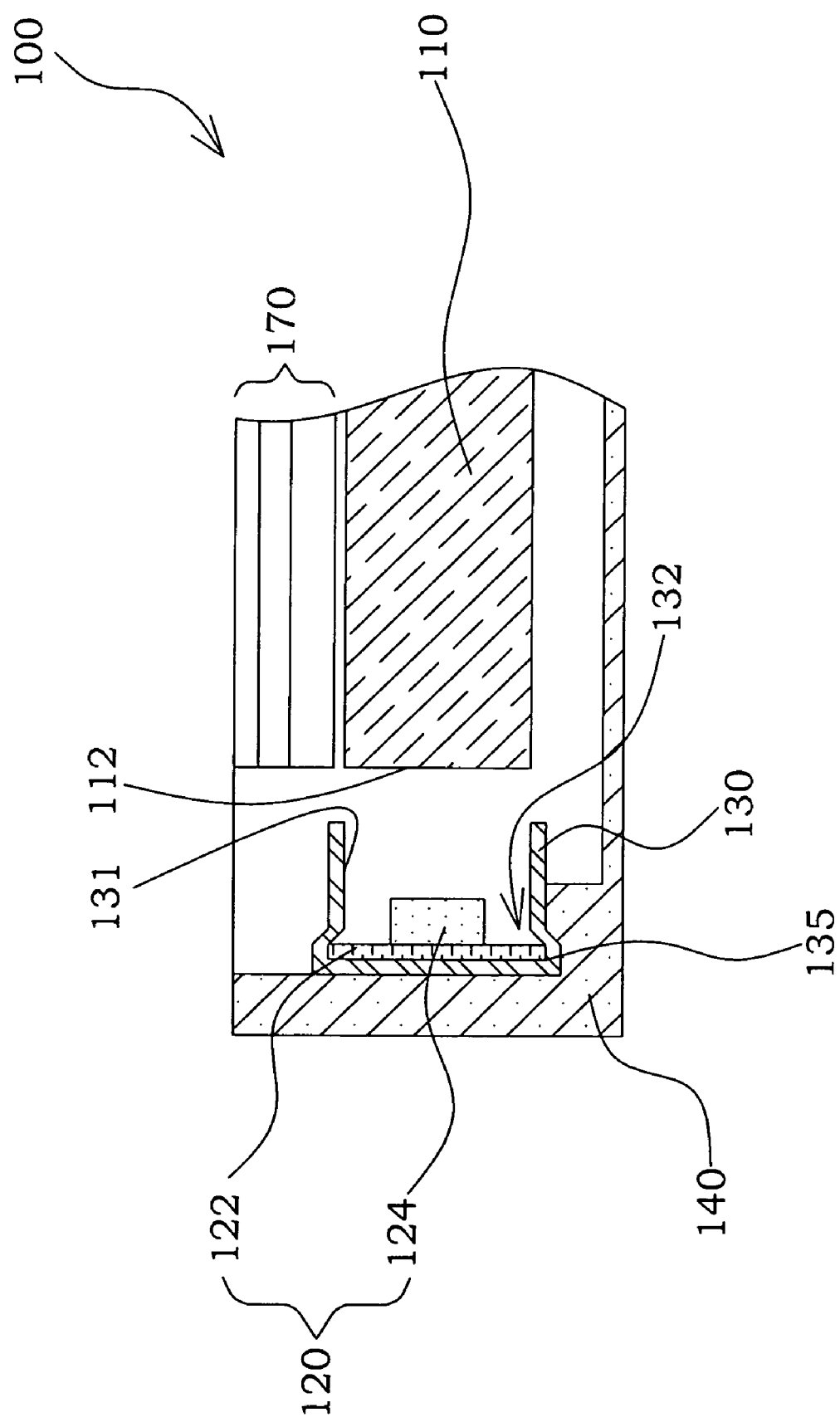
FIG. 5 is a cross-sectional view of the architecture of the backlight module of the fifth embodiment, in accordance with the present invention.

Continuously, please refer to FIG. 5, FIG. 5 is a cross-sectional view of the architecture of the backlight module of the fifth embodiment, in accordance with the present invention. The backlight module 100 includes a light guide plate 110, the light bar 120 and the cover 130 of the abovementioned embodiment. Wherein the light guide plate 110 has a light-incident surface; the groove 132 of the cover 130 having a surface 135 facing toward to the light-incident surface 112 of the light guide plate 110, wherein the light bar 120 can be arranged upon the surface 135 of the groove 132. The light bar 120 held by the frame 140 is arranged on the side edge of the light guide plate 110 so as to provide a side light to the light-incident surface 112 of the light guide plate 110. Such as described in the aforementioned embodiments, the light bar 120 includes a substrate 122, for example a printed circuit board, and a plurality of light emitting diodes 124 fixed on the substrate 122 by using the conventional technology method. In one embodiment, the light bar 120 further includes a good heat-conducted metal substrate 126 (as shown in FIG. 2A) adhered under the substrate 122 to increase the heat-sinking capability, for example the metal substrate 126 may be the Al substrate or the Cu substrate. Referring to FIG. 5, the cover 130 made of metal having good heat-sinking capability, such as the Al, provides with a groove 132 so as to arrange the light bar 120 within the groove 132. Moreover, there are at least a crook (shown in FIG. 4) or a plurality of fixing elements (not shown in the figure), for example screws, arranged in two sides of the cover 130 so as to fasten the light bar 120. In one embodiment, the region of the contact area between the substrate 122 of the light bar 120 and the crook 160 (shown in FIG. 4) can be utilized for the grounding design. In the embodiment, the backlight module 100 further includes a plurality of optical films 170 arranged above the light guide plate 110 so as to provide a good quality of illumination to the panel.

To sum up the foregoing descriptions, the present invention utilizes the light bar producing point light substituted for the lamp and arranged within the cover to provide the edge light to the light guide plate. Because of coating the reflection on the cover is unnecessary, the production cost will be lower down. The light bar can be arranged within the groove of the cover so as the light bar can be replaced easily by sliding out form the groove when the light bar was damaged. Furthermore, for preventing the backlight module over temperature, the substrate made of metal having high conductivity cooperates with the cover made of metal having good heat-sinking capability to lower the temperature. Moreover, the cover can enhance the assembly structure, fix the light bar, and increase the reliability.

The foregoing descriptions of specific embodiments of the present invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the Claims appended hereto and their equivalents.

What is claimed is:

1. A light-source fixing structure for a backlight module comprising:
   a light guide plate having a light-incident surface;
   a cover provided with a groove, wherein said groove has an inner surface facing toward to said light-incident surface of said light guide plate and an outer surface opposite to the inner surface;
   a light bar arranged upon said surface of said groove; and
   at least a crook arranged on the inner surface and the outer surface of the said cover and clipping said light bar and the cover so as to fix said light bar on the cover.

2. The light-source fixing structure for the backlight module according to claim 1, wherein said groove is formed by at least a protruded rib projected from the interior surface of said cover.

3. The light-source fixing structure for the backlight module according to claim 1, further comprising a plurality of fixing elements to join said light bar and said cover.

4. The light-source fixing structure for the backlight module according to claim 3, wherein said fixing elements comprise screws.

5. The light-source fixing structure for the backlight module according to claim 1, further comprising a plurality of optical films arranged above said light guide plate.

6. The light-source fixing structure for the backlight module according to claim 1, wherein said cover is a heat-sinking metal.

7. The light-source fixing structure for the backlight module according to claim 1, wherein said light bar comprises a substrate and at least a light emitting diode fixed on said substrate.

8. The light-source fixing structure for the backlight module according to claim 7, wherein said substrate comprises the printed circuit board.

9. The light-source fixing structure for the backlight module according to claim 7, further comprising a metal substrate adhered under said substrate, wherein said metal substrate comprises aluminum or copper.

* * * * *